(No Model.)
E. L. CLANCY.
FRAME FOR SULKY PLOWS.
No. 369,588. Patented Sept. 6, 1887.
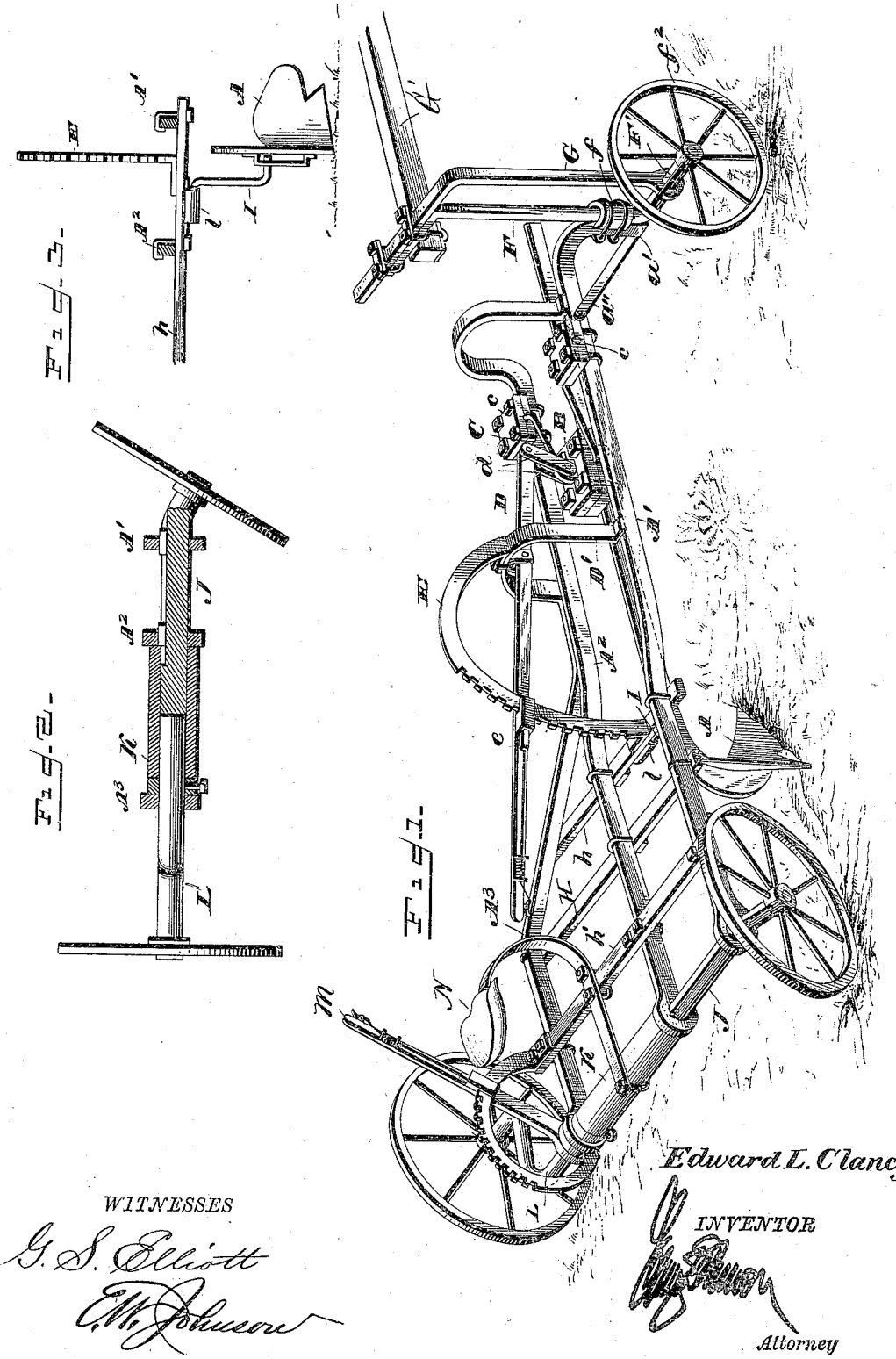
WITNESSES
G. S. Elliott
W. Johnson
Edward L. Clancy,
INVENTOR
Attorney

UNITED STATES PATENT OFFICE.

EDWARD L. CLANCY, OF ABERDEEN, DAKOTA TERRITORY.

FRAME FOR SULKY-PLOWS.

SPECIFICATION forming part of Letters Patent No. 369,588, dated September 6, 1887.

Application filed June 9, 1887. Serial No. 240,758. (No model.)

*To all whom it may concern:*

Be it known that I, EDWARD L. CLANCY, a citizen of the United States of America, residing at Aberdeen, in the county of Brown and Territory of Dakota, have invented certain new and useful Improvements in Frames for Sulky-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in frames for sulky-plows, the object of my invention being to provide a means whereby a plow of ordinary construction can be readily attached to a frame having supporting-wheels, the plow-beam being vertically adjustable with respect to the frame, and one of the wheels of the frame being adjustable, so that it can be accommodated to furrows of different depth; and my invention consists in the construction and combination of the parts, as will be hereinafter fully set forth, and specifically pointed out in the claims.

In the accompanying drawings, which illustrate my invention, Figure 1 is a perspective view of a plow-frame, showing a plow attached thereto, the same being constructed in accordance with my invention. Fig. 2 is a longitudinal sectional view through the rear axle, and Fig. 3 is a detail view.

A refers to a plow, which is of ordinary construction, except that the same is not provided with a landside, the mold-board being attached to the beam in the usual manner. This beam is connected near its forward end to a block, B, which is rigidly clamped upon the beam by means of suitable bolts and nuts, which bolts are U-shaped and passed through perforations in the block B. This block B has a transverse perforation, through which passes a bail or loop, C, the ends of this loop being bent outwardly, so as to engage with bearing-blocks $c$ $c$, which are attached to the frame. The end of the plow-beam is provided with a suitable clevis.

D refers to a lever, which is pivotally connected to a vertical yoke, D', which extends upwardly from the main frame, and the short end of this lever D is provided with links $d$ $d$, which are pivoted thereto so as to engage with an upwardly-projecting eye formed upon the upper central portion of the block B. From the yoke or portion D', at its upper end, there extends a rearwardly and downwardly bent segmental plate, E, which is provided with teeth, with which a spring-actuated locking-bar, $e$, which is carried by the lever D, engages.

The plow-beam can be raised and lowered by adjusting this lever D so as to cause the plow to enter the ground to a greater or less extent, or elevate the same so that it will lie against the frame out of contact with the ground.

At the front portion of the frame one of the side bars, A', of said frame is curved outwardly and downwardly, and to this downwardly-bent portion A' is attached a rearwardly-extending brace-rod, $a''$, which is connected to the bar A' slightly at the rear of its front end. A clip, $f$, is bolted to this downwardly-projecting portion and has bearing for a bent bar, F, the lower end, after passing through this bearing, being bent outwardly, so as to form a stub-axle, F', upon which is journaled a guide-wheel, $f^2$.

The stub-axle F', hereinbefore referred to, is encircled within the wheel by the lower end of a bar, G, which extends upwardly parallel with the bar F, the upper end thereof being bent horizontally, so as to lie over the horizontally-bent end of the bar F, to which it is clipped, so as to be rigid thereon. A tongue, G', is rigidly secured to the upper horizontal part of these bars F G, at a point substantially in a vertical plane with the clevis (not shown) at the end of the plow-beam, the movement of the tongue serving to guide the wheel $f^2$ without lateral strain on the plow-beam.

The main frame is made up of bars A', A², and A³, the bar A² extending parallel with the bar A' until it reaches a point near the front of the frame, where it is bent upwardly and downwardly so as to provide a yoke which will allow sufficient play for the plow-beam, besides rigidly connecting the beams A' and A² to each other. The beam A³, after extending for a slight distance parallel with the bars A' and A², converges toward the bar A² and forms a yoke, D', hereinbefore referred to. These bars A', A², and A³ are connected to each other by cross-bars $h$ and $h'$ and a central cross-bar, H. The cross-bar $h$ has a socket, $l$, secured to the under side of the same by suitable bolts, in which socket a bent bar, I, is secured. The bar I has its ends bent at right angles, as shown, and the lower end engages with a curved slotted plate which is attached to the plow-beam. This bar serves as a guide for elevating and lowering the plow, and also serves to hold said plow steady.

The rear end of the serrated segment E is rigidly attached to the cross-bar $h$ at a point between the bars A' and A². The rear ends of the bars A', A², and A³ are formed into eyes, and through the eyes formed on the bars A' and A² passes an axle, J, which is rigidly keyed to the aforesaid eyes. The outer end of this axle is bent downwardly, so that the wheel which is journaled thereon will be at an angle with the main frame and will follow immediately after the portion of the plow-beam which serves as a landside, said wheel traveling in the furrow immediately behind the plow.

Between the bars A² and A³ is secured a sleeve, K, which is supported at one end by the end of the axle J, which projects within said sleeve, and at the other end by the projecting end of the axle L, said axle L being bent at an angle, as shown, and is provided with a lever, M, which is rigidly keyed thereon, which lever is utilized for adjusting the axle and wheel carried thereby, so as to elevate or depress that side of the plow-frame.

The lever M, hereinbefore referred to, engages with the curved rack-bar, one end of which is bent around the axle, while the opposite end is attached above the bar $h'$.

A driver's seat, N, is suitably supported at the rear portion of the main frame, and is located so that the driver can have easy access to the ends of the levers M and D.

By the construction hereinbefore described the plow can be raised and lowered independent of the frame, and the frame may be adjusted so as to change the angle of the plow.

A plow-frame constructed as hereinbefore described is light and rigid, and the parts, should they become loosened from wear or use, can be readily tightened.

I claim—

1. A plow-frame for sulky-plows, consisting of bars A', A², and A³, bent substantially as shown, a bent wheel-axle journaled in the frame and provided with an adjusting-lever, the opposite wheel-axle bent obliquely downward, a socket carried by the outwardly and downwardly bent front end of bar A', and the bar F, having its vertical part journaled in said socket and its ends bent horizontally, and the wheel $f''$, mounted on the lower horizontal part of said bar, substantially as described.

2. In a frame for wheel-plows, the bars A' and A², arranged parallel to each other throughout their greatest length, the end of the bar A² being curved and connected to the bar A', the bar A³, rigidly attached to the bar A², the end thereof being curved upwardly to form a yoke, D', the terminal portion of which is attached to bar A', bearing-blocks $c$ $c$ and B, with which engages a bail, C, and the lever D, the parts being combined and organized substantially as and for the purpose set forth.

3. The combination, with a wheel-frame for plows, constructed substantially as shown, of the vertical bar F, having horizontally-bent ends, a brace-bar, G, attached to said horizontally-bent ends, the wheel $f^2$, and the draft bar or tongue adapted to be rotated in the supporting-frame, for the purpose set forth.

4. In combination with a plow-frame constructed substantially as described, a stub-axle, J, having the outer end bent downwardly, so that the wheel which is mounted thereon will rotate at an angle with respect to the frame, a vertically-adjustable wheel attached to a movable bent axle, L, and a sleeve, K, encircling the ends of the axles L and J and affording extension adjustment, said axles being encircled by eyes formed in the rear ends of bars A', A², and A³, for the purpose set forth.

5. The combination, with a plow-frame, constructed substantially as shown, and the plow-beam suspended from it, of the bar I, bent at right angles at each end, one end being pivoted in a sleeve on the under side of a cross-bar, the other end extending downwardly and outwardly to engage with a loop or keeper on the plow-beam, for the purpose set forth.

In testimony whereof I affix my signature in presence of two witnesses.

EDWARD L. CLANCY.

Witnesses:
J. W. CLANCY,
JAMES P. DAVIS.